(12) United States Patent
Hayano et al.

(10) Patent No.: US 8,993,675 B2
(45) Date of Patent: Mar. 31, 2015

(54) METHOD OF PRODUCTION OF RADIAL CONJUGATED DIENE POLYMER

(75) Inventors: Shigetaka Hayano, Tokyo (JP); Takeshi Sugimura, Tokyo (JP); Yasuhisa Tsukahara, Kyoto (JP)

(73) Assignee: Zeon Corporation, Tokyo (JP)

( * ) Notice: Subject to any disclaimer, the term of this patent is extended or adjusted under 35 U.S.C. 154(b) by 670 days.

(21) Appl. No.: 13/319,975

(22) PCT Filed: May 11, 2010

(86) PCT No.: PCT/JP2010/057945
§ 371 (c)(1),
(2), (4) Date: Nov. 10, 2011

(87) PCT Pub. No.: WO2010/131646
PCT Pub. Date: Nov. 18, 2010

(65) Prior Publication Data
US 2012/0071603 A1    Mar. 22, 2012

(30) Foreign Application Priority Data

May 11, 2009   (JP) .............................. 2009-114521

(51) Int. Cl.
 B60C 1/00     (2006.01)
 C08C 19/44    (2006.01)
 C08F 4/48     (2006.01)
 C08F 36/04    (2006.01)
 C08C 19/10    (2006.01)

(52) U.S. Cl.
 CPC ............. *C08C 19/44* (2013.01); *C08F 4/486* (2013.01); *C08C 19/10* (2013.01); *C08F 36/04* (2013.01)
 USPC ........................................................ 524/571

(58) Field of Classification Search
 CPC ......... C08C 19/10; C08C 19/44; C08F 36/04; C08F 4/46; C08F 4/486
 See application file for complete search history.

(56) References Cited

U.S. PATENT DOCUMENTS

| | | | |
|---|---|---|---|
| 5,527,860 A | 6/1996 | Yamakawa et al. | |
| 6,150,487 A | 11/2000 | Zhang et al. | |

FOREIGN PATENT DOCUMENTS

| | | |
|---|---|---|
| EP | 1 783 143 A1 | 5/2007 |
| GB | 1 555 729 | 11/1979 |
| JP | 2-229809 A | 9/1990 |
| JP | 6-279515 A | 10/1994 |
| JP | 10-226708 A | 8/1998 |
| JP | 11-513715 A | 11/1999 |
| JP | 2005-272643 A | 10/2005 |
| JP | 2006-306962 A | 11/2006 |

OTHER PUBLICATIONS

International Search Report for PCT/JP2010/057945 dated Aug. 10, 2010.
Lee et al., "Synthesis and Characterization of Well-Defined, Regularly Branched Polystyrenes Utilizing Multifunctional Initiators", Macromolecules, 2005, vol. 38, pp. 5381-5392.
Quirk et al., "Applications of 1,1-Diphenylethylene Chemistry in Anionic Synthesis of Polymers with Controlled Structures", Advances in Polymer Science, 2000, vol. 153, pp. 67-162.
Uemura et al., "Anion Ido o Tomonau Living Anion Jugo ni yoru Tabunki Polymer no Seisei no Kento", Polymer Preprints, Japan, May 8, 2008, vol. 57, No. 1, p. 538.
Uemura et al., "Lithiation ni yoru p-Methylstyrene Oligomer no Macroinitiator-ka to Tabunki Polymer no Gosei", Polymer Preprints, Japan, Sep. 9, 2008, vol. 57, No. 2, Disk 1, pp. 2428-2429.
Extended European Search Report, dated Mar. 5, 2013, for European Application No. 10774903.8.
Ma, "Synthesis of well-defined macrocyclic block copolymers using living coupling agent method", Macromol. Symp., 1995, vol. 91, pp. 41-49.

*Primary Examiner* — Peter D Mulcahy
(74) *Attorney, Agent, or Firm* — Birch, Stewart, Kolasch & Birch, LLP

(57) ABSTRACT

An alkali metal-reacted aromatic compound which has three or more carbon atoms which are directly bonded to alkali metal atoms and aromatic rings in one molecule is used as a polymerization initiator to polymerize a monomer mixture which is contains at least one conjugated diene compound to thereby produce a radial conjugated diene polymer. Further, active ends of the polymer having active ends which is obtained by this method is made to react with a modifier which can react with the active ends to thereby produce an end-modified radial conjugated diene polymer. According to the present invention, it is possible to provide a method of production of the radial conjugated diene polymer which gives a high degree of freedom of polymer design and easy control of the polymer structure.

11 Claims, No Drawings

METHOD OF PRODUCTION OF RADIAL CONJUGATED DIENE POLYMER

TECHNICAL FIELD

The present invention relates to a method of production of a radial conjugated diene polymer, more particularly relates to a method of production of a radial conjugated diene polymer which is high in freedom of polymer design such that it is easy to introduce any functional groups at the ends, further, facilitates advanced control of the polymer structure. Further, the present invention relates to a conjugated diene polymer composition which includes a radial conjugated diene polymer which can be obtained by this method of production and a filler and which is suitably used as a material for tire etc.

BACKGROUND ART

It is known that by giving a conjugated diene polymer a radial structure, it is possible to improve various properties compared with a linear conjugated diene polymer. For example, it is known that when used as a rubber material for tire use, by making the conjugated diene polymer a radial structure, the workability and the compatibility with a filler are improved.

Patent Document 1 describes, as a technique for obtaining a radial conjugated diene polymer, to use a lithium amide compound as a polymerization initiator to polymerize a conjugated diene and cause the obtained polymer to react with tin tetrachloride in a coupling reaction to thereby obtain a radial conjugated diene polymer which has amide groups at its ends. According to this method, it is possible to make the conjugated diene polymer a radial structure, then further introduce amide groups at its ends, so it becomes possible to obtain a conjugated diene polymer which is excellent in compatibility with a filler. However, with this method, there is the problem that the functional groups which can be introduced to the ends are limited to amide groups and it is not possible to introduce functional groups with a higher effect of improvement of compatibility with the filler, that is, there is the problem of a low degree of freedom of design of the polymer.

As a technique for making a conjugated diene polymer a radial structure in which functional groups can be freely introduced to the ends, the technique of using a polyvalent polymerization initiator which has a plurality of polymerization start points is known. For example, Patent Document 2 describes a method of polymerization of a conjugated diene using a polyvalent polymerization initiator which is obtained by polymerization of a small amount of divinyl benzene by an organolithium initiator. However, with this method, control of the branched structure is difficult. Further, when using the polymer as a material for tire, there was the problem that the starting end divinyl benzene cross-linked product had a detrimental effect on the performance for tire.

Further, as other techniques using a polyvalent polymerization initiator, the method as described in Patent Document 3 of using a polyvalent initiator obtained by causing an allene compound and organic lithium to react and the method as described in Patent Document 4 of using a polyvalent polymerization initiator obtained by using naphthalene lithium to polymerize a small amount of butadiene, then partially coupling the obtained polymer may be mentioned. However, with these methods as well, there were the problems that control of the branched structure was difficult and, further, the obtained conjugated diene polymer was liable to form a cross-linked structure. Further, with these methods, there was the problem that a considerable amount of linear conjugated diene polymer was unavoidably included and it was difficult to raise the ratio of the radial conjugated diene polymer.

On the other hand, as an example of using a polyvalent polymerization initiator to obtain a polymer other than a conjugated diene polymer, the example described in Non-Patent Document 1 of using a polyvalent lithium compound obtained by an anion transport reaction between a p-methylstyrene oligomer and s-butyl lithium as a polymerization initiator to polymerize the styrene is known. However, there is no known example of application of this method for the production of a conjugated diene polymer.

PRIOR ART DOCUMENTS

Patent Documents

Patent Document 1: Japanese Patent Publication (A) No. 6-279515
Patent Document 2: Japanese Patent Publication (A) No. 2-229809
Patent Document 3: Japanese Patent Publication (A) No. 10-226708
Patent Document 4: Japanese Patent Publication (A) No. 11-513715

Non-Patent Documents

Non-Patent Document 1: "Polymer Preprints, Japan", 2008, Vol. 57, No. 1, p. 538

DISCLOSURE OF THE INVENTION

Problem to be Solved by the Invention

The present invention has as its object the provision of a method of production of a radial conjugated diene polymer which is high in freedom of polymer design such that it is easy to introduce any functional groups at the ends, further, facilitates advanced control of the polymer structure. Further, the present invention has as its object the provision of a polymer composition which contains a radial conjugated diene polymer able to be obtained by this method of production and a filler and which is excellent in abrasion resistance and low heat buildup.

Means for Solving the Problems

The inventors engaged in intensive research for achieving the above objects and as a result discovered that by causing an aromatic compound which has three or more carbon atoms which are directly bonded to aromatic rings in one molecule to react with an organic alkali metal compound and using the obtained alkali metal-reacted aromatic compound as a polymerization initiator to polymerize a conjugated diene compound, a radial conjugated diene polymer which is highly controlled in structure is obtained. Further, the inventors discovered that the polymer having active ends which is obtained by this method can be easily reacted with any modifier. The present invention was completed based on these discoveries.

Therefore, according to the present invention, there is provided a method of production of a radial conjugated diene polymer comprising polymerizing a monomer mixture which contains at least a conjugated diene compound by using an alkali metal-reacted aromatic compound which has three or more carbon atoms which are directly bonded to alkali metal atoms and aromatic rings in one molecule as a polymerization initiator.

In the above method of production of a radial conjugated diene polymer, the monomer mixture preferably further includes an aromatic vinyl compound.

In the above method of production of a radial conjugated diene polymer, the alkali metal-reacted aromatic compound is preferably obtained by causing an aromatic compound which has three or more carbon atoms which are directly bonded to aromatic rings in one molecule to react with an organic alkali metal compound.

Further, according to the present invention, there is provided a method of production of an end-modified radial conjugated diene polymer comprising polymerizing a monomer mixture which contains at least a conjugated diene compound by using an alkali metal-reacted aromatic compound which has three or more carbon atoms which are directly bonded to alkali metal atoms and aromatic rings in one molecule as a polymerization initiator, and causing active ends of the obtained polymer having active ends to react with a modifier which is able to react with the active ends.

Furthermore, according to the present invention, there is provided a polymer composition containing a polymer obtained by the method of production of a radial conjugated diene polymer or the method of production of an end-modified radial conjugated diene polymer, and a filler.

Effects of the Invention

According to the method of production of a radial conjugated diene polymer of the present invention, it is possible to obtain a conjugated diene polymer which has a radial structure with good control, so it is also possible to make substantially completely all of the polymer a radial structure. Further, no impurities which could have a detrimental effect on the performance of the conjugated diene polymer as a material are included either. Further, it is possible to easily cause a modifier which can react with active ends of a polymer having active ends obtained by this method to react with the active ends, so the freedom of polymer design can be said to be high. Further, the polymer composition of the present invention is excellent in abrasion resistance and low heat buildup and can be suitably used as a material for tire etc.

DESCRIPTION OF EMBODIMENTS

The method of production of the radial conjugated diene polymer of the present invention uses an alkali metal-reacted aromatic compound which has three or more carbon atoms which are directly bonded to alkali metal atoms and aromatic rings in one molecule as a polymerization initiator so as to polymerize a monomer mixture which contains at least a conjugated diene compound.

The polymerization initiator used in the present invention is an alkali metal-reacted aromatic compound which has three or more carbon atoms which are directly bonded to alkali metal atoms and aromatic rings in one molecule. The alkali metal atoms which the alkali metal-reacted aromatic compound used as the polymerization initiator in the present invention have are not particularly limited, but lithium, sodium, or potassium is preferable. Among these, lithium is particularly preferable. Further, the aromatic rings which the alkali metal-reacted aromatic compound have are not particularly limited so long as conjugate rings which have an aromatic property, but as specific examples, an electrically neutral aromatic hydrocarbon ring such as a benzene ring, naphthalene ring, and anthracene ring; an aromatic hydrocarbon ring which has a negative charge such as a cyclopentadienyl anion ring, indenyl anion ring, and fluorenyl anion ring; an aromatic ring which contains a hetero atom such as a furan ring, and thiophen ring, etc. may be mentioned. Among these, an alkali metal-reacted aromatic compound which has electrically neutral aromatic hydrocarbon rings is preferably used from the viewpoint of the stability and polymerization activity.

Further, in the present invention, the alkali metal-reacted aromatic compound used as the polymerization initiator is not particularly limited in structure so long as it has three or more carbon atoms which are directly bonded to alkali metal atoms and aromatic rings in one molecule, but for example, it may be an alkali metal-reacted aromatic compound where three or more carbon atoms which are directly bonded to alkali metal atoms are directly bonded to one aromatic ring or may be an alkali metal-reacted aromatic compound where three or more aromatic rings, to each to which one or more carbon atoms directly bonded to alkali metal atoms are directly bonded, are bonded through bonding groups.

As the alkali metal-reacted aromatic compound where three or more carbon atoms which are directly bonded to alkali metal atoms are directly bonded to one aromatic ring, a compound which is expressed by the following general formula (1) is preferably used.

[Chemical Formula 1]

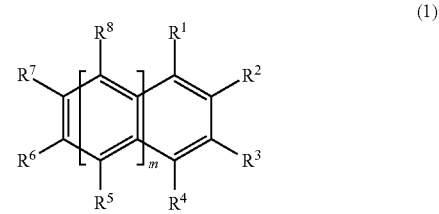

(1)

In the general formula (1), each of $R^1$ to $R^8$ indicates a group selected from a hydrogen atom, $C_1$ to $C_{10}$ alkyl groups, and $C_1$ to $C_{10}$ alkali metal-reacted alkyl groups to which an alkali metal atom is bonded at the α-position, while each of three or more of $R^1$ to $R^8$ is a $C_1$ to $C_{10}$ alkali metal-reacted alkyl group to which an alkali metal atom is bonded at the α-position. Further, m is an integer of 0 to 5. However, when m is 2 or more, regardless of the structure expressed by the general formula (1), the three or more present benzene rings may be condensed at any positions.

As the alkali metal-reacted aromatic compound where three or more aromatic rings, to each to which one or more carbon atoms directly bonded to alkali metal atoms are directly bonded, are bonded through a bonding groups, a compound expressed by the following general formula (2) is preferably used.

[Chemical Formula 2]

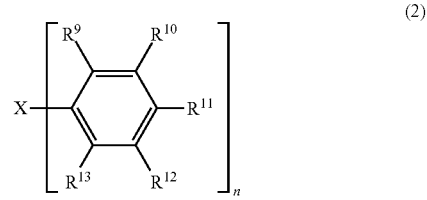

(2)

In the general formula (2), each of $R^9$ to $R^{13}$ indicates a group selected from a hydrogen atom, $C_1$ to $C_{10}$ alkyl groups, and $C_1$ to $C_{10}$ alkali metal-reacted alkyl groups to which an alkali metal atom is bonded at the α-position, while each of one or more of $R^9$ to $R^{13}$ is a $C_1$ to $C_{10}$ alkali metal-reacted alkyl group to which an alkali metal atom is bonded at the α-position. Further, X indicates any bonding group, while n is an integer of 3 to 100.

In the present invention, the method of synthesis of the alkali metal-reacted aromatic compound used as the polymerization initiator is not particularly limited, but an alkali metal-reacted aromatic compound which is obtained by making an aromatic compound which has three or more carbon atoms which are directly bonded to aromatic rings in one molecule react with an organic alkali metal compound is preferably used.

The organic alkali metal compound which is used for synthesizing the alkali metal-reacted aromatic compound is not particularly limited, but an alkali metal compound which has an alkyl group or aryl group is preferably used. As specific examples, methyl lithium, methyl sodium, methyl potassium, ethyl lithium, ethyl sodium, ethyl potassium, n-propyl lithium, isopropyl potassium, n-butyl lithium, s-butyl lithium, t-butyl lithium, n-butyl sodium, n-butyl potassium, pentyl lithium, n-amyl lithium, octyl lithium, phenyl lithium, naphthyl lithium, phenyl sodium, or naphthyl sodium may be mentioned.

To synthesize the alkali metal-reacted aromatic compound, when using an alkyl (or aryl) potassium or an alkyl (or aryl) sodium, a lithium compound which has an alkyl group or aryl group and a potassium or sodium compound having an alkoxy group may be mixed to obtain the targeted potassium or sodium compound. As the potassium or sodium compound having an alkoxy group which is used at this time, t-butoxy potassium or t-butoxy sodium may be illustrated. The amount of use of the potassium or sodium compound having an alkoxy group is not particularly limited, but is usually 0.1 to 5.0 mol, preferably 0.2 to 3.0 mol, more preferably 0.3 to 2.0 mol with respect to the lithium compound which has an alkyl group or aryl group.

As the aromatic compound which has three or more carbon atoms which are directly bonded to aromatic rings in one molecule which can be used for synthesis of the alkali metal-reacted aromatic compound, an aromatic compound which is expressed by the following general formula (3), which can be used to obtain an alkali metal-reacted aromatic compound which is expressed by the above-mentioned general formula (1) or an aromatic compound which is expressed by the following general formula (4), which can be used to obtain an alkali metal-reacted aromatic compound which is expressed by the above-mentioned general formula (2) may be mentioned.

[Chemical Formula 3]

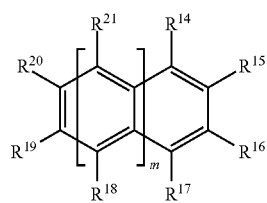

(3)

In the general formula (3), each of $R^{14}$ to $R^{21}$ indicates a group selected from a hydrogen atom and $C_1$ to $C_{10}$ alkyl groups, while each of three or more of $R^{14}$ to $R^{21}$ is $C_1$ to $C_{10}$ alkyl groups. Further, m is an integer of 0 to 5. However, when m is 2 or more, regardless of the structure expressed by the general formula (3), the three or more present benzene rings may be condensed with each other at any position.

[Chemical Formula 4]

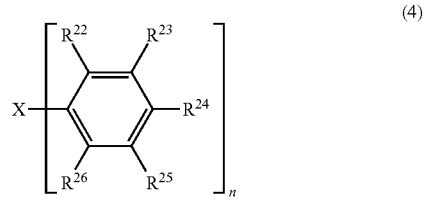

(4)

In the general formula (4), each of $R^{22}$ to $R^{26}$ indicates a group selected from a hydrogen atom and $C_1$ to $C_{10}$ alkyl groups, while each of the one or more of $R^{22}$ to $R^{26}$ is a $C_1$ to $C_{10}$ alkyl group. Further, X indicates any bonding group, while n is an integer of 3 to 100.

As specific examples of the aromatic compound expressed by the general formula (3), benzenes which have three or more alkyl groups such as 1,2,3-trimethylbenzene, 1,2,4-trimethylbenzene, 1,3,5-trimethylbenzene, and hexamethylbenzene; naphthalenes which have three or more alkyl groups such as 2,3,5-trimethylnaphthalene, and 1,4,5-trimethylnaphthalene, etc. may be mentioned.

Further, as specific examples of the aromatic compound expressed by the general formula (4), a polymer of styrene which has an alkyl group on a benzene ring such as o-methylstyrene oligomer, methylstyrene oligomer, p-methylstyrene oligomer, and p-ethylstyrene oligomer, etc. may be mentioned.

The method of causing the aromatic compound which has three or more carbon atoms which are directly bonded to aromatic rings in one molecule to react with an organic alkali metal compound is not particularly limited, but the method of causing a reaction under an inert atmosphere in an inert solvent is preferably used. The inert solvent which is used is not particularly limited so long as a solvent which can dissolve the compound which is reacted, but use of a hydrocarbon-based solvent is preferable. Specifically, an aliphatic hydrocarbon such as n-hexane, n-heptane, and n-octane; an alicyclic hydrocarbon such as cyclohexane, cyclopentane, and methylcyclohexane, etc. may be mentioned. Note that, these solvents may be used either alone or as a mixture of two or more thereof. Further, the amount of use of the organic alkali metal compound with respect to the aromatic compound which has three or more carbon atoms which are directly bonded to aromatic rings in one molecule is not particularly limited, but is usually 0.1 to 100 mol with respect to 1 mol of the carbon atoms which are directly bonded to the aromatic rings in the aromatic compound, preferably 0.2 to 50 mol, more preferably 0.3 to 10 mol, most preferably 0.3 to 1.1 mol. The reaction time and the reaction temperature of this reaction are not particularly limited, but the reaction time is usually 1 minute to 10 days, preferably 1 minute to 5 days in range, while the reaction temperature is usually −50° C. to 100° C. in range.

Further, in causing the aromatic compound which has three or more carbon atoms which are directly bonded to aromatic rings in one molecule to react with the organic alkali metal compound, to promote the reaction, it is also possible to establish the copresence of a compound which has a coordinating ability on alkali metal atoms. As the compound which has a coordinating ability on alkali metal atoms, a Lewis base compound which contains a hetero atom is preferably used. Among these, a Lewis base compound which contains a nitrogen atom or oxygen atom is particularly preferably used. As specific examples of a Lewis base compound which contains a nitrogen atom or oxygen atom, a chain ether compound such as diethyl ether, anisole, diphenyl ether, dimethoxybenzene, dimethoxyethane, diglyme, and ethyleneglycol dibutyl ether; a tertiary amine compound which has one nitrogen atom in the molecule such as trimethylamine, and triethylamine; a cyclic ether compound having one oxygen atom in the molecule such as tetrahydrofuran, and tetrahydropyrane; a nitrogen-containing heterocyclic compound such as pyridine, lutidine, and 1-methylimidazole; a cyclic ether compound which has two or more oxygen atoms in the molecule such as bistetrahydrofuryl propane; a tertiary amine compound which has two or more nitrogen atoms in the molecule such as N,N,N', N'-tetramethylethylenediamine, dipiperidinoethane, 1,4-diazabicyclo[2.2.2]octane, (−)-sparteine, and N,N,N',N',N"-pentamethyldiethylenetriamine; a tertiary amide compound which has a nitrogen-hetero atom bond in the molecule such as hexamethylphosphoamide; etc. may be mentioned.

The amount of use of the compound which has a coordinating ability on alkali metal atoms is not particularly limited, but should be determined in accordance with the strength of the coordinating ability. For example, when using as the compound which has a coordinating ability on alkali metal atoms a compound with a relatively weak coordinating ability such as a chain ether compound or a tertiary amine compound which has one nitrogen atom in the molecule, the amount of use is usually 1 to 100 mol with respect to 1 mol of the alkali metal atoms in the organic alkali metal compound made to react with the aromatic compound, preferably 5 to 50 mol, more preferably 10 to 25 mol in range. Further, when using as the compound which has a coordinating ability on alkali metal atoms a compound with a medium extent of coordinating ability such as a cyclic ether compound having one oxygen atom in the molecule or a nitrogen-containing heterocyclic compound, the amount of use is usually 1 to 100 mol with respect to 1 mol of the alkali metal atoms in the organic alkali metal compound made to react with the aromatic compound, preferably 1 to 20 mol, more preferably 2 to 10 mol in range. Further, when using as the compound which has a coordinating ability on alkali metal atoms a compound with a relatively strong coordinating ability such as a cyclic ether compound which has two or more oxygen atom in the molecule or a tertiary amine compound which has two or more nitrogen atoms in the molecule, or a tertiary amide compound which has a nitrogen-hetero atom bond in the molecule, the amount of use is usually 0.01 to 5 mol with respect to 1 mol of the alkali metal atoms in the organic alkali metal compound made to react with the aromatic compound, preferably 0.01 to 2 mol, more preferably 0.01 to 1.5 mol in range. If the amount of use of a compound which has a coordinating ability on alkali metal atoms is too great, the reaction is liable to no longer proceed.

From the viewpoint of making the production efficiency of the aromatic compound which has three or more carbon atoms which are directly bonded to aromatic rings in one molecule particularly good and raising the ratio of the radial conjugated diene polymer in the conjugated diene polymer, as the compound which has a coordinating ability on alkali metal atoms, it is preferable to use at least one compound selected from a cyclic ether compound which has two or more oxygen atoms in the molecule, a tertiary amine compound which has two or more nitrogen atoms in the molecule, and a tertiary amide compound which has a nitrogen-hetero atom bond in the molecule and to make the amount of use 0.02 to 0.4 mol in range with respect to 1 mol of alkali metal atoms in the organic alkali metal compound which is made to react with the aromatic compound.

In causing an aromatic compound to react with an organic alkali metal compound, when establishing copresence of a compound which has a coordinating ability on alkali metal atoms, the sequence of addition is not particularly limited. However, from the viewpoint of making the production efficiency of the alkali metal-reacted aromatic compound particularly good, the sequence of establishing the copresence of an aromatic compound and organic alkali metal compound, then adding to the system the compound which has a coordinating ability on alkali metal atoms or the sequence of establishing the copresence of an aromatic compound and a compound which has a coordinating ability on alkali metal atoms, then adding to the system an organic alkali metal compound is suitable. By adding the ingredients in such a sequence, insolubility due to the organic alkali metal compound and the compound which has a coordinating ability on alkali metal atoms forming a complex is prevented and the production efficiency of the alkali metal-reacted aromatic compound becomes particularly good.

In the method of production of a radial conjugated diene polymer of the present invention, for example a monomer mixture which contains at least a conjugated diene compound is polymerized by using an alkali metal-reacted aromatic compound which has three or more carbon atoms which are directly bonded to alkali metal atoms and aromatic rings in one molecule obtained in the above way as a polymerization initiator. Note that, the term "monomer mixture" is a concept including being comprised of just one conjugated diene compound. The conjugated diene compound which is used as the monomer in the present invention is not particularly limited, but, for example, 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, 1,3-cyclohexadiene, etc. may be mentioned. In the method of production of the radial conjugated diene polymer of the present invention, among these conjugated diene compounds as well, 1,3-butadiene, isoprene, or 1,3-pentadiene is particularly preferably used. Note that, these conjugated diene compounds may be used either alone or as a combination of two or more thereof.

In the method of production of a radial conjugated diene polymer of the present invention, in addition to the conjugated diene compound, it is also possible to use a monomer mixture which contains other monomers to obtain a copolymer. As the compounds other than the conjugated diene compound which can be used as monomers in the present invention, for example, an aromatic vinyl compound such as styrene, α-methylstyrene, p-methylstyrene, vinyl naphthalene, and vinylpyridine; an acrylic acid ester compound such as methyl methacrylate, and methyl acrylate, etc. may be mentioned. The content of the monomers other than the conjugated diene compound in the monomer mixture is not particularly limited, but is usually 50 mol % or less, preferably 45 mol % or less. If the content of the monomers other than the conjugated diene compound in the monomer mixture is too great, the obtained conjugated diene polymer is liable to be inferior in characteristics as a conjugated diene polymer.

In the method of production of the radial conjugated diene polymer of the present invention, the type of the copolymer when using a monomer mixture containing two or more monomers to obtain a copolymer is not particularly limited, but a random type, block type, tapered type, etc. are possible.

In the method of production of the radial conjugated diene polymer of the present invention, usually, the polymerization reaction proceeds along with the living property, so the ratio of use of the alkali metal-reacted aromatic compound which is used as the polymerization initiator and the monomer mixture should be determined in accordance with the molecular weight of the targeted polymer, but the amount of the alkali metal in the alkali metal-reacted aromatic compound is usually selected in the range of 0.000001 to 0.1 mol with respect to 1 mol of the monomer mixture, preferably 0.00001 to 0.05 mol. If the amount of use of the alkali metal-reacted aromatic compound is too small, the obtained radial conjugated diene polymer becomes too high in molecular weight and the handling becomes difficult or the polymerization reaction is liable not to sufficiently proceed. On the other hand, if the amount of use of the alkali metal-reacted aromatic compound is too large, the obtained radial conjugated diene polymer becomes too low in molecular weight and the characteristics as a rubber material are liable to become inferior.

Further, in performing the polymerization reaction, to control the polymerization speed and the microstructure of the obtained radial conjugated diene polymer, it is also possible to add the above compound which has a coordinating ability on alkali metal atoms to the polymerization reaction system. The amount of use of these compounds which have a coordinating ability on alkali metal atoms is usually 0 to 5 mol with respect to 1 mol of the alkali metal atoms in the alkali metal-reacted aromatic compound which is used as the polymerization initiator, preferably 0 to 4 mol, more preferably 0 to 2 mol in range. If the amount of use of these compounds which have a coordinating ability on alkali metal atoms is too great, the polymerization reaction is liable to be impaired. Note that, in preparing the alkali metal-reacted aromatic compound to be used as the polymerization initiator, when using a compound which has a coordinating ability on alkali metal atoms, it is also possible to use as is a solution which contains that compound.

In particular, from the viewpoint of obtaining a conjugated diene polymer composition with excellent low heat buildup, it is preferable to establish the presence of at least one compound selected from a cyclic ether compound which has two or more oxygen atoms in the molecule, a tertiary amine compound which has two or more nitrogen atoms in the molecule, and a tertiary amide compound which has a nitrogen-hetero atom bond in the molecule in 0.02 to 0.4 mol in range with respect to 1 mol of the alkali metal atoms in the alkali metal compound used as a polymerization initiator (the "alkali metal compound" referred to here not being limited to an alkali metal-reacted aromatic compound and including all alkali metal compounds present in the reaction system and acting as a polymerization initiator). By doing this, a radial conjugated diene polymer which has a suitable vinyl bond content is obtained. As a result, it is particularly possible to obtain a conjugated diene polymer composition with excellent low heat buildup.

The polymerization system in the method of production of the radial conjugated diene polymer of the present invention is not particularly limited, but for example a vapor phase polymerization method, a solution polymerization method, a slurry polymerization method, etc. may be employed. Among these in particular, use of the solution polymerization method is preferable.

When using the solution polymerization method, the solvent which is used is not particularly limited so long as being a solvent which is inert in the polymerization reaction and able to dissolve the monomer mixture and polymerization catalyst, but use of a hydrocarbon-based solvent is preferable. Specifically, for example, an aromatic hydrocarbon such as benzene, toluene, xylene, and ethylbenzene; an aliphatic hydrocarbon such as n-hexane, n-heptane, and n-octane; an alicyclic hydrocarbon such as cyclohexane, cyclopentane, and methylcyclohexane; an ether such as tetrahydrofuran, diethyl ether, and cyclopentylmethyl ether, etc. may be mentioned. Among these, aliphatic hydrocarbons or alicyclic hydrocarbons are preferable since the polymerization activity becomes higher if they are used as solvents. Note that, these solvents may be used either alone or as a mixture of two or more thereof.

When using the solution polymerization method, the concentration of the monomer mixture in the polymerization solution is not particularly limited, but usually is selected in the range of 1 to 50 wt %, preferably 2 to 45 wt %, more preferably 5 to 40 wt %. If the concentration of the monomer mixture in the solution is too low, the productivity of the radial conjugated diene polymer is liable to deteriorate, while if the concentration is too high, the viscosity of the solution sometimes becomes too high and the handling becomes difficult. Further, the polymerization temperature is also not particularly limited, but is usually −30° C. to 200° C., preferably 0° C. to 180° C. in range. The polymerization time is also not particularly limited. It is usually 1 minutes to 100 hours in range.

In the method of production of the radial conjugated diene polymer of the present invention, usually the polymerization reaction proceeds along with the living property, so the polymerization reaction system contains a polymer which has active ends. This polymer which has active ends may be made to react with a reaction stopper such as alcohol and water, but it is preferable to cause a reaction with any modifier which can react with the active ends so as to obtain an end-modified radial conjugated diene polymer. By obtaining an end-modified radial conjugated diene polymer in this way, it is possible to modify the obtained radial conjugated diene polymer by a modifier and possible to for example improve the compatibility with silica, carbon black, or other filler.

The modifier which is used to obtain the end-modified radial conjugated diene polymer is not particularly limited so long as a modifier which can react with the active ends of a polymer. Further, it is also possible to use a modifier which has a plurality of reaction sites which can react with the active ends of a polymer in one molecule (coupling agent) so as to perform a coupling reaction.

As the modifier able to be used in the present invention, for example, (a) an isocyanate compound or an isothiocyanate compound (hereinafter referred to as the "(a) component"), (b) an isocyanulic acid derivative or a thiocarbonyl-containing compound corresponding to that derivative (hereinafter referred to as the "(b) component"), (c) a urea compound (hereinafter referred to as the "(c) component"), (d) an amide compound and/or imide compound (hereinafter referred to as the "(d) component"), (e) an N-alkyl-substituted oxazolidinone compound (hereinafter referred to as the "(e) component"), (f) a pyridyl-substituted ketone compound and/or a pyridyl-substituted vinyl compound (hereinafter referred to as the "(f) component"), (g) a lactam compound (hereinafter referred to as the "(g) component"), (h) a silicon compound (hereinafter referred to as the "(h) component"), (i) an ester compound (hereinafter referred to as the "(i) component"), (j) a ketone compound (hereinafter referred to as the "(j) component"), (k) a tin compound (hereinafter referred to as the "(k) component"), etc. may be mentioned.

Among these modifiers, as specific examples of the (a) component of the isocyanate compound or the isothiocyanate compound, 2,4-tolylene diisocyanate, 2,6-tolylene diisocyanate, diphenylmethane diisocyanate, polymeric type diphenylmethane diisocyanate (C-MDI), phenyl isocyanate, isophorone diisocyanate, hexamethylene diisocyanate, butyl isocyanate, 1,3,5-benzene triisocyanate, phenyl isothiocyanate, phenyl-1,4-diisothiocyanate, etc. may be mentioned. As specific examples of the (b) component of the isocyanulic acid derivative or thiocarbonyl-containing compound corresponding to that derivative, a carbamic acid derivative such as methyl carbamate, and methyl N,N-diethyl carbamate, an isocyanulic acid derivative such as isocyanulic acid, and N,N',N'-trimethylisocyanulic acid, or thiocarbonyl-containing compound corresponding to that derivative, etc. may be mentioned. As specific examples of the (c) component of the urea compound, N,N'-dimethylurea, N,N'-diethylurea, N,N,N',N'-tetramethylurea, N,N-dimethyl-N',N'-diphenylurea, etc. may be mentioned. As specific examples of the (d) component of the amide compound or imide compound, an amide compound such as N,N-dimethylformamide, acetoamide, N,N-diethylacetoamide, aminoacetoamide, N,N-dimethyl-N',N'-dimethylaminoacetoamide, N,N-dimethylaminoacetoamide, N,N-ethylaminoacetoamide, N,N-dimethyl-N'-ethylaminoacetoamide, acrylamide, N,N-dimethylacrylamide, N,N-dimethyl methacrylamide, nicotinamide, isonicotinamide, picolinic acid amide, N,N-dimethyl isonicotinamide, succinic acid amide, phthalic acid amide, N,N,N',N'-tetramethylphthalic acid amide, oxamide, N,N,N',N'-tetramethyloxamide, 2-furan carboxylic acid amide, N,N-dimethyl-2-furan carboxylic acid amide, quinoline-2-carboxylic acid amide, and N-ethyl-N-methyl-quinolinecarboxylic acid amide, an imide compound such as succinic acid imide, N-methyl succinimide, maleimide, N-methyl maleimide, phthalimide, and N-methyl phthalimide, etc. may be mentioned. As specific examples of the (e) component of N-alkyl-substituted oxazolidinone compound, 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, etc. may be mentioned. As specific examples of the (f) component of the pyridyl-substituted ketone compound or pyridyl-substituted vinyl compound, methyl-2-pyridylketone, methyl-4-pyridylketone, propyl-2-pyridylketone, di-4-pyridylketone, propyl-3-pyridylketone, 2-benzoylpyridine, 2-vinyl pyridine, 4-vinyl pyridine, etc. may be mentioned. As specific examples of the (g) component of the lactam compound, N-methyl-2-pyrrolidone, 2-piperidone, N-methyl-2-piperidone, 2-quinolone, N-methyl-quinolone, etc. may be mentioned.

The amount of use when using these modifiers is not particularly limited, but the amount of the functional groups in the modifier such as isocyanate groups, isothiocyanate groups, carbonyl groups, vinyl groups, and aldehyde groups is usually 0.2 to 10 mol per 1 mol of alkali metal atoms in the alkali metal-reacted aromatic compound which is used as the polymerization initiator, preferably 0.5 to 5.0 mol in range. If the amount of use of the modifier is too small, the effect of the end-modification is liable to not be able to be sufficiently obtained. On the other hand, if the amount of use of the modifier is too great, the obtained polymer will contain a large amount of residual unreacted modifier. As a result, this is liable to cause odor, a drop in physical properties, or other detrimental effects on the polymer.

Further, as specific examples of the (h) component of the silicon compound which can be used as the modifier, dibutyldichlorosilane, methyltrichlorosilane, dimethyldichlorosilane, methyldichlorosilane, trimethylchlorosilane, tetrachlorosilane, triphenoxymethylsilane, tetramethoxysilane, a polyorganosiloxane expressed by the following general formula (5), etc. may be mentioned. The amount of use of this silicon compound is determined so that an amount of groups which can react with the active ends of the polymer in the silicon compound (halogen atoms, alkoxy groups, aryloxy groups, or epoxy groups) is usually 0.05 to 5 mol per 1 mol of the alkali metal atoms in the alkali metal-reacted aromatic compound which is used as a polymerization initiator, preferably 0.1 to 1.5 mol in range.

[Chemical Formula 5]

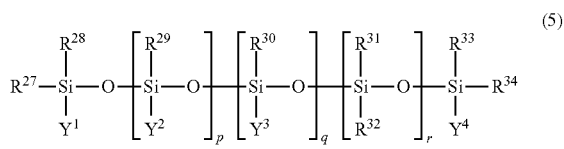

(5)

In the general formula (5), each of $R^{27}$ to $R^{34}$ indicates a group selected from $C_1$ to $C_6$ alkyl groups and $C_6$ to $C_{12}$ aryl groups. Each of $Y^1$ and $Y^4$ indicates a group selected from $C_1$ to $C_5$ alkoxyl groups, $C_6$ to $C_{14}$ aryloxy groups, or $C_4$ to $C_{12}$ groups which contain an epoxy group, $C_1$ to $C_6$ alkyl groups, and $C_6$ to $C_{12}$ aryl groups. $Y^2$ indicates a group selected from $C_1$ to $C_5$ alkoxyl groups, $C_6$ to $C_{14}$ aryloxy groups, and $C_4$ to $C_{12}$ groups which contain an epoxy group. $Y^3$ indicates a group which contains 2 to 20 repeat units of alkylene glycol. p is an integer of 2 to 200, q is an integer of 0 to 200, and r is an integer of 0 to 200.

As specific examples of the (i) component of the ester compound which can be used as the modifier, diethyl adipate, diethyl malonate, diethyl phthalate, diethyl glutarate, diethyl maleate, etc. may be mentioned. The amount of use of these ester compounds is usually 0.05 to 1.5 mol in range per 1 mol of alkali metal atoms in the alkali metal-reacted aromatic compound which is used as the polymerization initiator. As specific examples of the (j) component of the ketone compound which can be used as the modifier, N-methyl-2-pyrrolidone, N,N-dimethylformamide, nicotinamide, 4,4'-bis (diethylamino)benzophenone, etc. may be mentioned. The amount of use of these is usually 0.05 to 5 mol in range per 1 mol of alkali metal atoms in the alkali metal-reacted aromatic compound which is used as the polymerization initiator. As specific examples of the (k) component of the tin compound which can be used as the modifier, tetrachloro tin, tetrabromo tin, trichlorobutyl tin, trichloromethyl tin, trichlorooctyl tin, dibromodimethyl tin, dichlorodimethyl tin, dichlorodibutyl tin, dichlorodioctyl tin, 1,2-bis(trichlorostannyl)ethane, 1,2-bis(methyldichlorostannyl)ethane, 1,4-bis(trichlorostannyl) butane, 1,4-bis(methyldichlorostannyl)butane, ethyltin trisstearate, butyltin trisoctanoate, butyltin trisstearate, butyltin trislaurate, dibutyltin bisoctanoate, dibutyltin bisstearate, dibutyltin bis(laurate), etc. may be mentioned. The amount of use of these is usually 0.05 to 5 mol in range per 1 mol of alkali metal atoms in the alkali metal-reacted aromatic compound which is used as the polymerization initiator.

The modifier which is used to obtain the end-modified radial conjugated diene polymer may be used either alone or as a combination of two or more thereof. Further, for the purpose of improving the reaction efficiency between the active ends of the polymer and the modifier, after the end of the polymerization reaction, it is possible to further add to the polymerization reaction system a conjugated diene compound in an amount of 0.5 to 500 mol per 1 mol of alkali metal atoms in the alkali metal-reacted aromatic compound which is used as the polymerization initiator, preferably 1 to 200 mol, then perform an end-modification reaction. Further, the temperature of the modification reaction is not particularly limited, but is usually 0 to 120° C. in range.

To the solution of the radial conjugated diene polymer obtained in the above way, it is possible to add, as desired, an antioxidant such as a phenol-based stabilizer, phosphorus-based stabilizer, and sulfur-based stabilizer. The amount of the antioxidant added may be suitably determined in accordance with the type etc. Furthermore, if desired, an extension oil may also be blended in. After the polymerization reaction or after the modification reaction, the polymer is separated and obtained from the reaction mixture by for example reprecipitation, removal of the solvent under heating, removal of the solvent under reduced pressure, removal of the solvent by steam (steam stripping), or other ordinary operation for separating a polymer from a solution.

According to the above method of production of the radial conjugated diene polymer of the present invention, the alkali metal-reacted aromatic compound which is used as the polymerization initiator uses the three or more alkali metal atoms as polymerization start points and the conjugated diene polymer chain grows along with the living polymerizing ability, so it becomes possible to obtain a conjugated diene polymer which has a radial structure with good control and also becomes possible to substantially completely make the entire polymer a branched structure. However, in the method of production of the radial conjugated diene polymer of the present invention, by controlling the degree of alkali metal reaction of the aromatic compound, it is also possible to obtain a polymer mixture of a radial conjugated diene polymer and linear conjugated diene polymer mixed together. The ratio of the radial conjugated diene polymer (that is, the three-branch or more conjugated diene polymer) in this polymer mixture is not particularly limited, but the ratio of the amount of the radial conjugated diene polymer to the total of the radial conjugated diene polymer and the linear conjugated diene polymer is usually 20 to 100 wt %, preferably 30 to 100 wt %. Due to the presence of the radial conjugated diene polymer in this ratio, the workability of the conjugated diene polymer and the compatibility with a filler etc. become particularly good. Further, the molecular weight of this polymer mixture is not particularly limited. It may be suitably determined in accordance with the application, but the number average molecular weight (Mn) which is found by gel permeation chromatography as the polystyrene conversion value is usually selected from 500 to 1,000,000 in range. Further, the microstructure of the radial conjugated diene polymer is not particularly limited, but the vinyl bond content in the conjugated diene unit parts of the radial conjugated diene polymer is usually 1.0 to 80 mol %, preferably 3.0 to 75 mol %. However, from the viewpoint of obtaining a conjugated diene polymer composition with excellent low heat buildup, the vinyl bond content in the conjugated diene unit part of the radial conjugated diene polymer is particularly preferably 5.0 to 30 mol %.

The radial conjugated diene polymer which is obtained by the present invention has a multibranched structure and, in some cases, includes an end-modified polymer, so mixing with a filler such as silica and carbon black, a rubber such as natural rubber (NR), polyisoprene rubber (IR), styrene-butadienethe copolymer rubber (SBR), and polybutadiene rubber (BR) is easy. A conjugated diene polymer composition can be easily produced. Furthermore, it is possible to easily mix compounding ingredients such as a cross-linking agent, cross-linking accelerator, ocross-linking activator, antioxidant, activator, process oil, plasticizer, and lubricant into the radial conjugated diene polymer in the necessary amounts.

The radial conjugated diene polymer which is obtained by the present invention can be used for a broad range of applications. For example, utilization for tackifier/adhesive applications such as a sealing agent, sealant, adhesive, and tackifier; utilization for thermoplastic elastomer applications; utilization for tire parts such as treads, carcasses, sidewalls, and bead parts; utilization for rubber products such as hoses, window frames, belts, shoe soles, vibration insulator rubbers, and automobile parts; utilization as resin-reinforcing rubbers such as high-impact polystyrene, and ABS resin, etc. become possible.

The radial conjugated diene polymer which is obtained by the present invention can be used as a composition containing a filler so as to obtain a polymer composition which is excellent in abrasion resistance and low heat buildup. That is, the polymer composition of the present invention includes the radial conjugated diene polymer which is obtained by the method of production of the radial conjugated diene polymer of the present invention and a filler. The filler which is used is not particularly limited, but at least one filler which is selected from silica and carbon black is preferable.

As the silica, for example, dry-process white carbon, wet-process white carbon, colloidal silica, precipitated silica, etc. may be mentioned. Among these, wet-process white carbon mainly comprised of hydrous silicic acid is preferably used. Further, it is also possible to use a carbon-silica dual phase filler comprised of carbon black on the surface of which silica is carried. These silica may be used either alone or as a combination of two or more thereof. The nitrogen adsorption specific surface area of the silica used (measured in accordance with ASTM D3037-81 by BET method) is preferably 50 to 300 $m^2/g$, more preferably 80 to 220 $m^2/g$, particularly preferably 100 to 170 $m^2/g$. Further, the pH of the silica is preferably less than pH 7, more preferably pH 5 to pH 6.9.

As the carbon black, for example, furnace black, acetylene black, thermal black, channel black, graphite, etc. may be mentioned. When using carbon black, use of furnace black is preferable, as specific examples, SAF, ISAF, ISAF-HS, ISAF-TS, IISAF-HS, HAF, HAF-HS, HAF-LS, T-HS, T-NS, MAF, FEF, etc. may be mentioned. These carbon black may be used either alone or as a combination of two or more thereof.

The amount of the filler blended into the polymer composition of the present invention is not particularly limited, but is usually 5 to 200 parts by weight with respect to 100 parts by weight of the polymer component in the polymer composition, preferably 20 to 150 parts by weight.

The polymer composition of the present invention may include other polymers besides the radial conjugated diene polymer which is obtained by the present invention blended into it. As the other polymers, for example, rubbery polymers such as natural rubber, polyisoprene rubber, emulsion polymerized styrene-butadiene copolymer rubber, solution polymerized styrene-butadiene copolymer rubber, polybutadiene rubber (may also be polybutadiene rubber containing crystal fibers made of 1,2-polybutadiene polymer), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber may be mentioned. Among these in particular, natural rubber, polyisoprene rubber, polybutadiene rubber, or styrene-butadiene copolymer rubber is preferably used. These polymers may be used either alone or as a combination of two or more thereof.

The method of adding the filler to the polymer is not particularly limited, but the method of adding and kneading it to a solid polymer (dry kneading method) or the method of adding it to a solution of the polymer then coagulation and drying the same (wet kneading method) etc. may be used.

The polymer composition of the present invention may have added to it, in addition to the above components, by an ordinary method, compounding ingredients such as cross-linking agent, cross-linking accelerator, cross-linking activator, antioxidant, activator, process oil, plasticizer, lubricant, tackifier, silane coupling agent, and ammonium hydroxide in the necessary amounts.

As the cross-linking agent, for example, sulfur, halogenated sulfur, an organic peroxide, quinone dioximes, an organic polyamine compound, an alkyl phenol resin which has a methylol group, etc. may be mentioned. Among these, sulfur is preferably used. The amount of the cross-linking agent is preferably 1.6 to 5.0 parts by weight with respect to 100 parts by weight of the polymer component of the polymer composition, more preferably 1.7 to 4.0 parts by weight, particularly preferably 1.9 to 3.0 parts by weight.

As the cross-linking accelerator, for example, a sulfenamide-based cross-linking accelerator such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; a guanidine-based cross-linking accelerator such as diphenylguanidine, di-o-tolylguanidine, and o-tolylbiguanidine; a thiourea-based cross-linking accelerator; a thiazole-based cross-linking accelerator; a thiuram-based cross-linking accelerator; a dithiocarbamic acid-based cross-linking accelerator; a xantogenic acid-based cross-linking accelerator; etc. may be mentioned. Among these, one including a sulfenamide-based cross-linking accelerator is particularly preferable. These cross-linking accelerators are used either alone or as a combination of two or more thereof. The amount of the cross-linking accelerator is preferably 0.1 to 15 parts by weight with respect to 100 parts by weight of the polymer component of the polymer composition, more preferably 0.5 to 5 parts by weight, particularly preferably 1.0 to 4.0 parts by weight.

As the cross-linking activator, for example, higher fatty acid such as stearic acid or zinc oxide etc. may be used. The amount of the cross-linking activator is suitably selected, but the amount of the higher fatty acid is preferably 0.05 to 15 parts by weight with respect to 100 parts by weight of the polymer component of the polymer composition, more preferably 0.5 to 5 parts by weight, while the amount of the zinc oxide is preferably 0.05 to 10 parts by weight with respect to 100 parts by weight of the rubber component, more preferably 0.5 to 3 parts by weight.

To obtain the polymer composition of the present invention, the components may be kneaded in accordance with an ordinary method. For example, the compounding ingredients other than the cross-linking agent and cross-linking accelerator and the polymer component are kneaded, then the kneaded matter is mixed with the cross-linking agent and cross-linking accelerator to obtain the target composition. The kneading temperature of the compounding agents other than the cross-linking agent and cross-linking accelerator and the polymer component is preferably 80 to 200° C., more preferably 120 to 180° C. and the kneading time of that is preferably 30 seconds to 30 minutes. The kneaded matter is mixed with the cross-linking agent and cross-linking accelerators after cooling usually down to 100° C. or less, preferably 80° C. or less.

The polymer composition of the present invention may, for example, used in a tire as a material for tire parts such as captread, base tread, carcass, sidewalls, and bead part, as a material for a hose, belt, mat, vibration insulator rubber, or other various industrial parts, and, further, as an adhesive, an agent for improving the shock resistance of resins, a resin film buffer agent, a shoe sole, rubber shoes, golf balls, and toys. Among these, since the polymer composition of the present invention is excellent in abrasion resistance and low heat buildup, it is possible to particularly preferably use this as a material for a tire for reducing fuel consumption.

The method of cross-linking and shaping when using the polymer composition of the present invention to form a tire or other rubber product (cross-linked product) is not particularly limited, but may be selected in accordance with the shape, size, etc. of the cross-linked product. It is possible to fill a mold with the polymer composition containing a cross-linking agent and heating it to perform cross-linking simultaneously with the shaping or to shape the polymer composition containing the cross-linking agent in advance, then heating it to cross-link. The cross-linking temperature is preferably 120 to 200° C., more preferably 140 to 180° C., while the cross-linking time is usually 1 to 120 minutes or so.

EXAMPLES

Below, the present invention will be explained further based on detailed examples, but the present invention is not limited to these examples. Note that in the examples, the parts and %, unless indicated to the contrary, are based on weight.

The various measurements were performed by the following methods:

[Molecular Weight of Polymer]

Gel permeation chromatography was used to find the molecular weight converted to polystyrene. Specifically, the following conditions were used for measurement.

Measuring device: High speed liquid chromatograph (made by Toso, product name "HLC-8220")

Column: Made by Toso, product name "GMH-HR-H", two connected in series.

Detector: Differential inflection meter (made by Toso, product name "RI-8220")

Elution solution: Tetrahydrofuran

Column temperature: 40° C.

[Microstructure of Polymer]

Measured by $^1$H-NMR.

[Low Heat Buildup]

A viscoelasticity measurement device (made by Rheometrics, product name "ARES") was used for measurement of the tan δ at 60° C. under conditions of 2.5% torsion and 10 Hz. This characteristic was indicated indexed to a reference sample as 100. The smaller the index value, the better the low heat buildup.

[Abrasion Resistance]

An FPS abrasion tester made by Ueshima Seisakusho was used for measurement at a load of 1 kgf and a slip rate of 15%. This characteristic was indicated indexed to a reference sample as 100. The larger the index value, the better the abrasion resistance.

Reference Example 1

Synthesis of p-Methylstyrene Oligomer

Under a nitrogen atmosphere, a glass reaction vessel equipped with a magnetic stirrer was charged with 48.0 parts of cyclohexane and 1.13 parts of p-methylstyrene. Next, while stirring, 0.0615 part of sec-butyl lithium was added and the mixture was polymerized at a polymerization temperature of 40° C. for 1 hour while stirring. A small amount of methanol was used to stop the polymerization reaction, pure water was used to extract and wash the catalyst residue, then the solvent was distilled off to thereby obtain 1.12 parts of the target oligomer of p-methylstyrene. The obtained oligomer of the p-methylstyrene had an Mn of 1,280, an Mw of 1,440, a molecular weight distribution (Mw/Mn) of 1.13, and an average polymerization degree found from the value of Mn of 10.8.

Example 1

Lithiation of p-Methylstyrene Oligomer and Polymerization of Isoprene by Lithiated p-Methylstyrene Oligomer Under a nitrogen atmosphere, a glass reaction vessel equipped with a magnetic stirrer was charged with 2.81 parts of cyclohexane, 0.284 part of the oligomer of p-methylstyrene obtained at Reference Example 1, and 0.279 part of tetramethylethylenediamine. Next, while stirring, 0.154 part of sec-butyl lithium (1.0 mol of tetramethylethylenediamine per 1 mol of sec-butyl lithium) was added and the mixture was reacted at a reaction temperature of 20° C. for 40 minutes while stirring. Next, 18.7 parts of benzene and 3.00 parts of isoprene were added and the mixture was polymerized at a polymerization temperature of 40° C. for 2 hours while stirring. A small amount of methanol was used to stop the polymerization reaction, pure water was used to extract and wash the catalyst residue, then the solvent was distilled off to thereby obtain 3.26 parts of the target polyisoprene. The obtained polyisoprene had an Mn of 14,800, an Mw of 18,600, a molecular weight distribution (Mw/Mn) of 1.26, and a vinyl bond content of 77 mol %. The average number of branches of the polyisoprene derived from one molecule of the oligomer of p-methylstyrene, calculated based on the amount of the sec-butyl lithium used and the actually measured Mn, was 10.8 (Mn per branch=1,300), so it is estimated that about 100% of the obtained polyisoprene was a three-branched or higher radial polymer.

Reference Example 2

Lithiation of 1,3,5-Trimethylbenzene and Measurement of Lithiation Rate—1

Under a nitrogen atmosphere, a glass reaction vessel was charged with 12 parts of cyclohexane, 0.144 part of 1,3,5-trimethylbenzene, and 0.460 part of tetramethylethylenediamine. Next, while stirring, 0.230 part of n-butyl lithium (1.1 mol of tetramethylethylenediamine per 1 mol of n-butyl lithium) was added and the mixture was allowed to stand at a reaction temperature of 20° C. for 3 days for a reaction. Next, to measure the Lithiation rate of the lithiated 1,3,5-trimethylbenzene which was obtained by the reaction, several drops of the obtained reaction solution were added to a glass vessel to which an excess amount of trimethylsilyl chloride was added and the mixture was allowed to react for 30 minutes. Tapwater was used to extract and wash the catalyst residue, then the solvent was distilled off to obtain a yellow oily liquid. This yellow oily liquid was measured by gas chromatograph mass spectroscopy (GC-MS). The results were as follows. EI-MS, m/z=120 (M+) (2%), m/z=192 (M+) (13%), m/z=264 (M+) (57%), m/z=336 (M+) (28%). Mw=120 (2%), Mw=192 (13%), Mw=264 (57%), Mw=336 (28%). Next, this yellow oily liquid was measured by $^1$H-NMR. The results were as follows. $^1$H-NMR (CDCl$_3$) 6.83 (s, 3H, Ph-H), 6.73 (s, 1H, Ph-H), 6.64 (s, 2H, Ph-H), 6.55 (s, 2H, Ph-H), 6.47 (s, 1H, Ph-H), 6.39 (s, 3H, Ph-H), 2.30 (s, 9H, Ph-CH$_3$), 2.28 (s, 6H, Ph-CH$_3$), 2.02 (s, 2H, Ph-CH$_2$—SiMe$_3$), 2.26 (s, 3H, Ph-CH$_3$), 2.00 (s, 4H, Ph-CH$_2$—SiMe$_3$), 1.98 (s, 6H, Ph-CH$_2$—SiMe$_3$). Furthermore, $^1$H-detected multi-bond heteronuclear multiple quantum coherence spectrum-NMR (HMBC-NMR) measurement was used for attribution of the signals in $^1$H-NMR. The results were as follows. non-substituted compound (1,3,5-trimethylbenzene) $^1$H-NMR (CDCl$_3$) 6.83 (s, 3H, Ph-H), 2.30 (s, 9H, Ph-CH$_3$), 1-substituted compound (1-trimethylsilylmethyl-3,5-dimethylbenzene) $^1$H-NMR (CDCl$_3$) 6.73 (s, 1H, Ph-H), 6.64 (s, 2H, Ph-H), 2.28 (s, 6H, Ph-CH$_3$), 2.02 (s, 2H, Ph-CH$_2$—SiMe$_3$), 2-substituted compound (1,3-bis(trimethylsilylmethyl)-5-methylbenzene) $^1$H-NMR (CDCl$_3$) 6.55 (s, 2H, Ph-H), 6.47 (s, 1H, Ph-H), 2.26 (s, 3H, Ph-CH$_3$), 2.00 (s, 4H, Ph-CH$_2$—SiMe$_3$), 3-substituted compound (1,3,5-tris(trimethylsilylmethyl)benzene) $^1$H-NMR (CDCl$_3$) 6.39 (s, 3H, Ph-H), 1.98 (s, 6H, Ph-CH$_2$—SiMe$_3$). Based on the attribution by the above $^1$H-NMR, HMBC-NMR, the molecular ion peaks obtained by GC-MS were attributed as follows: EI-MS, m/z=120 (M+) is the non-substituted compound (1,3,5-trimethylbenzene)), m/z=192 (M+) is the 1-substituted compound (1-trimethylsilylmethyl-3,5-dimethylbenzene), m/z=264 (M+) is the 2-substituted compound (1,3-bis(trimethylsilylmethyl)-5-methylbenzene), and m/z=336 (M+) is the 3-substituted compound (1,3,5-tris(trimethylsilylmethyl)benzene). From the above, the ratio (molar ratio) of the non-substituted compound:1-substituted compound:2-substituted compound:3-substituted compound is found as 2:13:57:28, the Lithiation rate of the methyl groups of 1,3,5-trimethylbenzene is 70%, and the average number of lithium atoms introduced into 1 molecule of 1,3,5-trimethylbenzene is 2.11.

Example 2

Polymerization of Isoprene by Lithiated 1,3,5-Trimethylbenzene and End-Modification Reaction—1

Under a nitrogen atmosphere, a glass reaction vessel equipped with a magnetic stirrer was charged with 12 parts of cyclohexane, 0.144 part of 1,3,5-trimethylbenzene, and 0.460 part of tetramethylethylenediamine. Next, while stirring, 0.230 part of n-butyl lithium (1.1 mol of tetramethylethylenediamine per 1 mol of n-butyl lithium) was added, the mixture was stirred at the reaction temperature of 20° C. for 3 hours, then the mixture was allowed to stand for 3 days for a reaction. Next, 3.68 parts of isoprene was added and the mixture was polymerized at a polymerization temperature of 40° C. for 4 hours while stirring. Next, an excess amount of trimethylchlorosilane with respect to the n-butyl lithium was added to cause an end-modification reaction. The solvent was distilled off to thereby obtain 4.00 parts of the target end-modified polyisoprene. The obtained end-modified polyisoprene, when measured by GPC, was comprised of an elution component (peak area ratio 35.2%) which had an Mn of 2,100, an Mw of 2,500, and a molecular weight distribution (Mw/Mn) of 1.19 and an elution component (peak area ratio 64.8%) which had an Mn of 5,900, an Mw of 6,300, and a molecular weight distribution (Mw/Mn) of 1.07. Overall, an Mn was 3,600, an Mw was 5,000, and a molecular weight distribution (Mw/Mn) was 1.39. Further, this end-modified polyisoprene had a vinyl bond content of 70 mol %. Furthermore, this end-modified polyisoprene was measured by $^1$H-NMR whereupon it was confirmed that trimethylsilyl groups were introduced. The number of functionalized ends of the polyisoprene (that is, the number of branches) calculated from the peaks derived from the 1,3,5-trimethylbenzene and the peaks derived from the introduced trimethylsilyl groups was 2.03 per molecule of 1,3,5-trimethylbenzene. This value matches well with the average number of lithium atoms, that is 2.11, introduced into one molecule of 1,3,5-trimethylbenzene of Reference Example 2, so the ratio of the 3-branched forms in the obtained end-modified polyisoprene is estimated to be 28 mol %.

Example 3

Polymerization of Isoprene by Lithiated 1,3,5-Trimethylbenzene and End-Modification Reaction—2

Under a nitrogen atmosphere, a glass reaction vessel equipped with a magnetic stirrer was charged with 0.138 part of n-hexane, 0.014 part of 1,3,5-trimethylbenzene, and 0.460 part of tetramethylethylenediamine. Next, 0.230 part of n-butyl lithium (1.1 mol of tetramethylethylenediamine per 1 mol of n-butyl lithium) was added and the mixture was allowed to stand at the reaction temperature of 20° C. for 4 days for reaction. Next, 12 parts of cyclohexane and 3.68 parts of isoprene were added and the mixture was polymerized at a polymerization temperature of 40° C. for 4 hours while stirring. Next, an excess amount of trimethylchlorosilane with respect to the n-butyl lithium was added to perform an end-modification reaction. The solvent was distilled off to thereby obtain 3.46 parts of the target end-modified polyisoprene. The obtained end-modified polyisoprene, when measured by GPC, was comprised of an elution component (peak area ratio 57.4%) which had an Mn of 17,500, an Mw of 20,200, and a molecular weight distribution (Mw/Mn) of 1.16 and an elution component (peak area ratio 42.6%) which had an Mn of 39,000, an Mw of 40,500, and a molecular weight distribution (Mw/Mn) of 1.04. Overall, an Mn was 22,900, an Mw was 29,000, and a molecular weight distribution (Mw/Mn) was 1.26. Further, this end-modified polyisoprene had a vinyl bond content of 68 mol %. Furthermore, this end-modified polyisoprene was measured by $^1$H-NMR whereupon it was confirmed that trimethylsilyl groups were introduced.

Example 4

Polymerization of Isoprene by Lithiated 1,3,5-Trimethylbenzene and End-Modification Reaction—3

Under a nitrogen atmosphere, a glass reaction vessel equipped with a magnetic stirrer was charged with 0.028 part of n-hexane, 2.88×10$^{-3}$ part of 1,3,5-trimethylbenzene, and 9.20×10$^{-3}$ part of tetramethylethylenediamine. Next, 4.60×10$^{-3}$ part of n-butyl lithium (1.1 mol of tetramethylethylenediamine per 1 mol of n-butyl lithium) was added and the mixture was allowed to stand at the reaction temperature of 20° C. for 4 days for a reaction. Next, 12 parts of cyclohexane and 3.68 parts of isoprene were added and the mixture was polymerized at a polymerization temperature of 40° C. for 4 hours while stirring. Next, an excess amount of trimethylchlorosilane with respect to the n-butyl lithium was added to perform an end-modification reaction. The solvent was distilled off to thereby obtain 3.52 parts of the target end-modified polyisoprene. The obtained end-modified polyisoprene, when measured by GPC, was comprised of an elution component (peak area ratio 70.8%) which had an Mn of 89,500, an Mw of 97,800, and a molecular weight distribution (Mw/Mn) of 1.09 and an elution component (peak area ratio 29.2%) which had an Mn of 188,400, an Mw of 195,100, and a molecular weight distribution (Mw/Mn) of 1.04. Overall, an Mn was 105,800, an Mw was 126,200, and a molecular weight distribution (Mw/Mn) was 1.19. Further, this end-modified polyisoprene had a vinyl bond content of 70 mol %. Furthermore, this end-modified polyisoprene was measured by $^1$H-NMR, whereupon it was confirmed that trimethylsilyl groups were introduced.

Example 5

Polymerization of Isoprene by Lithiated 1,3,5-Trimethylbenzene and End-Modification Reaction—4

Under a nitrogen atmosphere, a glass reaction vessel equipped with a magnetic stirrer was charged with 0.014 part of n-hexane, 1.44×10$^{-3}$ part of 1,3,5-trimethylbenzene, and 9.20×10$^{-3}$ part of tetramethylethylenediamine. Next, 2.30×10$^{-3}$ part of n-butyl lithium (1.1 mol of tetramethylethylenediamine per 1 mol of n-butyl lithium) was added and the mixture was allowed to stand at a reaction temperature of 20° C. for 4 days for a reaction. Next, 12 parts of cyclohexane and 3.68 parts of isoprene were added and the mixture was polymerized at a polymerization temperature of 40° C. for 4 hours while stirring. Next, an excess amount of trimethylchlorosilane with respect to the n-butyl lithium was added to perform an end-modification reaction. The solvent was distilled off to thereby obtain 3.56 parts of the target end-modified polyisoprene. The obtained end-modified polyisoprene, when measured by GPC, was comprised of an elution component (peak area ratio 77.7%) which had an Mn of 156,800, an Mw of 177,400, and a molecular weight distribution (Mw/Mn) of 1.13 and an elution component (peak area ratio 22.3%) which had an Mn of 359,800, an Mw of 371,000, and a molecular weight distribution (Mw/Mn) of 1.03. Overall, an Mn was 179,400, an Mw was 220,500, and a molecular weight distribution (Mw/Mn) was 1.23. Further, this end-modified polyisoprene had a vinyl bond content of 72 mol %. Furthermore, this end-modified polyisoprene was measured by $^1$H-NMR, whereupon it was confirmed that trimethylsilyl groups were introduced.

Reference Example 3 to 16

Lithiation of 1,3,5-Trimethylbenzene and Measurement of Lithiation Rate

Except for changing the amount of use of tetramethylethylenediamine and the reaction time of the n-butyl lithium and tetramethylethylenediamine as shown in Table 1, the same procedure was followed as in Reference Example 2 to lithiolate the 1,3,5-trimethylbenzene and measure the ratio of the non-substituted compound to 3-substituted compound. However, for Reference Examples 10 and 11, the tetramethylethylenediamine was replaced with bistetrahydrofurylpropane in the ratios shown in Table 1 for use. Further, regarding Reference Examples 12 to 16, the n-butyl lithium was replaced with sec-butyl lithium in the ratios shown in Table 1 for use. The ratios of the non-substituted compound to 3-substituted compound measured in the examples are shown in Table 1. As will be understood from Table 1, when using 0.33 mol of tetramethylethylenediamine or bistetrahydrofurylpropane with respect to 1 mol of alkali metal atoms in the organic alkali metal compound (n-butyl lithium or sec-butyl lithium), the ratio of the 3-substituted compound becomes the highest.

TABLE 1

| | Reference Example | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 |
| Alkyl lithium | n-BuLi | | | | | | | | | | | sec-BuLi | | | |
| Lewis base compound | TMEDA* | | | | | | | | BTHFP* | | | TMEDA* | | | |
| Amount of Lewis base compound to alkyl lithium 1 mol (mol) | 1.1 | 2.0 | 1.0 | 0.50 | 0.33 | 0 | 0.33 | 1.1 | 1.0 | 0.33 | 1.0 | 0.33 | 0.10 | 0.050 | 0 |
| Reaction time (days) | 3 | 4 | 4 | 4 | 4 | 4 | 5 | 5 | 4 | 4 | 1 | 1 | 1 | 1 | 1 |
| ratio of substituted compound (%) Non-substituted compound | 2 | 5 | 3 | 4 | 4 | 100 | 1 | 1 | 1 | 5 | 4 | 0 | 7 | 11 | 100 |
| 1-substituted compound | 13 | 25 | 11 | 8 | 7 | 0 | 3 | 15 | 11 | 16 | 18 | 1 | 7 | 8 | 0 |
| 2-substituted compound | 57 | 56 | 49 | 60 | 51 | 0 | 42 | 54 | 58 | 43 | 57 | 52 | 55 | 53 | 0 |
| 3-substituted compound | 28 | 14 | 27 | 28 | 38 | 0 | 54 | 30 | 30 | 36 | 21 | 47 | 31 | 28 | 0 |

*TMEDA = tetramethylethylenediamine BTHFP = bistetrahydrofurylpropane

Example 6

Polymerization of Butadiene by Lithiated 1,3,5-Trimethylbenzene and End-Modification Reaction—1

Under a nitrogen atmosphere, a glass reaction vessel equipped with a magnetic stirrer was charged with 0.55 part of n-hexane, 0.056 part of 1,3,5-trimethylbenzene, and 0.184 part of tetramethylethylenediamine. Next, while stirring, 0.092 part of n-butyl lithium (1.1 mol of tetramethylethylenediamine per 1 mol of n-butyl lithium) was added, the mixture was stirred at a reaction temperature of 20° C. for 3 hours, then the mixture was allowed to stand for 4 days for a reaction. Next, 900 parts of cyclohexane and 100 parts of butadiene were added and the mixture was polymerized at a polymerization temperature of 60° C. for 3 hours while stirring. Next, an excess amount of trimethylchlorosilane with respect to the n-butyl lithium was added to perform an end-modification reaction. The solvent was distilled off to thereby obtain 100 parts of the target end-modified polybutadiene. The obtained end-modified polybutadiene, when measured by GPC, was comprised of an elution component (peak area ratio 51.3%) which had an Mn of 1,300,000, an Mw of 1,350,000, and a molecular weight distribution (Mw/Mn) of 1.04 and an elution component (peak area ratio 48.7%) which had an Mn of 627,000, an Mw of 681,000, and a molecular weight distribution (Mw/Mn) of 1.07. Overall, an Mn was 855,000, an Mw was 1,020,000, and a molecular weight distribution (Mw/Mn) was 1.20. Further, this end-modified polybutadiene had a vinyl bond content of 53 mol %. Furthermore, this end-modified polybutadiene was measured by $^1$H-NMR, whereupon it was confirmed that trimethylsilyl groups were introduced.

Example 7

Polymerization of Butadiene by Lithiated 1,3,5-Trimethylbenzene and End-Modification Reaction—2

Under a nitrogen atmosphere, a glass reaction vessel equipped with a magnetic stirrer was charged with 0.55 part of n-hexane, 0.056 part of 1,3,5-trimethylbenzene, and 0.055 part of tetramethylethylenediamine. Next, while stirring, 0.092 part of n-butyl lithium (0.33 mol of tetramethylethylenediamine per 1 mol of n-butyl lithium) was added, the mixture was stirred at a reaction temperature of 20° C. for 3 hours, then the mixture was allowed to stand for 4 days for reaction. Next, 900 parts of cyclohexane and 100 parts of butadiene were added, then the mixture was polymerized at a polymerization temperature of 60° C. for 3 hours while stirring. Next, an excess amount of trimethylchlorosilane with respect to the n-butyl lithium was added to cause an end-modification reaction. The solvent was distilled off to thereby obtain 100 parts of the target end-modified polybutadiene. The obtained end-modified polybutadiene, when measured by GPC, was comprised of an elution component (peak area ratio 63.9%) which had an Mn of 1,760,000, an Mw of 1,840,000, and a molecular weight distribution (Mw/Mn) of 1.04 and an elution component (peak area ratio 36.1%) which had an Mn of 918,000, an Mw of 986,000, and a molecular weight distribution (Mw/Mn) of 1.07. Overall, an Mn was 1,321,000, an Mw was 1,530,000, and a molecular weight distribution (Mw/Mn) was 1.16. Further, this end-modified polybutadiene had a vinyl bond content of 25 mol %. Furthermore, this end-modified polybutadiene was measured by $^1$H-NMR, whereupon it was confirmed that trimethylsilyl groups were introduced.

Example 8

Polymerization of Butadiene by Lithiated 1,3,5-Trimethylbenzene and End-Modification Reaction—3

Under a nitrogen atmosphere, a glass reaction vessel equipped with a magnetic stirrer was charged with 0.138 part of n-hexane, 0.014 part of 1,3,5-trimethylbenzene, and 0.0021 part of tetramethylethylenediamine. Next, while stirring, 0.023 part of sec-butyl lithium (0.05 mol of tetramethylethylenediamine per 1 mol of sec-butyl lithium) was added, the mixture was stirred at a reaction temperature of 20° C. for 3 hours, then the mixture was allowed to stand for 1 day for reaction. Next, 12 parts of cyclohexane was added, then 0.1 part of butadiene was added over 3 hours and the mixture was polymerized at a polymerization temperature of 60° C. while stirring. Furthermore, 3.58 parts of butadiene was added and the mixture was polymerized at a polymerization temperature of 60° C. for 1 hour while stirring. Next, an excess amount of trimethylchlorosilane with respect to sec-butyl lithium was added to cause an end-modification reaction. The solvent was distilled off to thereby obtain 3.58 parts of the target end-modified polybutadiene. The obtained end-modified polybutadiene, when measured by GPC, was comprised of an elution component (peak area ratio 55.3%) which had an Mn of 16,200, an Mw of 19,400, and a molecular weight distribution (Mw/Mn) of 1.19 and an elution component (peak area ratio 44.7%) which had an Mn of 43,600, an Mw of 45,800, and a molecular weight distribution (Mw/Mn) of 1.05. Overall, an Mn was 22,500, an Mw was 31,200, and a molecular weight distribution (Mw/Mn) was 1.39. Further, this end-modified polybutadiene had a vinyl bond content of 10 mol %. Furthermore, this end-modified polybutadiene was measured by $^1$H-NMR, whereupon it was confirmed that trimethylsilyl groups were introduced.

Example 9

Potassiation of p-Methylstyrene Oligomer and Polymerization of Isoprene by Potassiated p-Methylstyrene Oligomer Under a nitrogen atmosphere, a glass reaction vessel equipped with a magnetic stirrer was charged with 2.81 parts of cyclohexane, 0.284 part of an oligomer of p-methylstyrene obtained in Reference Example 1, and 0.402 part of potassium tertiary butoxide. Next, while stirring, 0.230 part of sec-butyl lithium was added, then the mixture was reacted at a reaction temperature of 20° C. for 30 minutes while stirring. Next, the p-methylstyrene oligomer which was Potassiated and made insoluble was recovered by filtration and separated from the dissolved unreacted component. The recovered Potassiated p-methylstyrene oligomer was dissolved under a nitrogen atmosphere in a glass reaction vessel equipped with a magnetic stirrer in 18.7 parts of benzene, 3.354 parts of isoprene was further added, and the mixture was polymerized at a polymerization temperature of 20° C. for 12 hours while stirring. A small amount of methanol was used to stop the polymerization reaction, pure water was used to extract and wash the catalyst residue, then the solvent was distilled off to thereby obtain 3.62 parts of the target polyisoprene. The obtained polyisoprene had an Mn of 25,500, an Mw of 44,900, a molecular weight distribution (Mw/Mn) of 1.76, and a vinyl bond content of 32 mol %. The average number of branches of the polyisoprene, calculated based on the amount of a sec-butyl lithium used and the actually measured Mn, was 27.3 (Mn per branch=935), so it is estimated that about 100% of the obtained polyisoprene was a three-branched or higher radial polymer.

Example 10

Synthesis of End-Modified Radial Polybutadiene and Production of Polymer Composition—1

Under a nitrogen atmosphere, a glass reaction vessel equipped with a magnetic stirrer was charged with 48 parts of cyclohexane, 0.722 part of 1,3,5-trimethylbenzene, and 2.302 parts of tetramethylethylenediamine. Next, while stirring, 1.152 parts of n-butyl lithium (1.1 mol of tetramethylethylenediamine per 1 mol of n-butyl lithium) was added, the mixture was stirred at a reaction temperature of 20° C. for 3 hours, then the mixture was allowed to stand for 4 days for causing a reaction to thereby obtain a solution of 52.176 parts of lithiated 1,3,5-trimethylbenzene. Next, under a nitrogen atmosphere, an autoclave was charged with 800 parts of cyclohexane, 200 parts of 1,3-butadiene, and 0.835 part of tetramethylethylenediamine, then the 52.176 parts of the above solution of lithiated 1,3,5-trimethylbenzene was added (amount of tetramethylethylenediamine present in reaction system was 1.5 mol per 1 mol of the n-butyl lithium which was used for the Lithiation of the 1,3,5-trimethylbenzene) and the polymerization was started at 60° C. The polymerization reaction was continued for 120 minutes. After the polymerization conversion was confirmed to become from 95% to 100% in range, 0.610 part of tetramethoxysilane was added. The reaction was caused for 30 minutes, then a polymerization stopper comprised of 0.128 part of methanol was added to obtain a solution containing end-modified radial polybutadiene. An antioxidant comprised of 0.15 part of 2,4-bis[(octylthio)methyl]-o-cresol (made by Ciba Specialty Chemicals, product name "Irganox 1520") with respect to 100 parts of the polymer component was added to the solution, then steam stripping was used to remove the solvent. The result was vacuum dried at 60° C. for 24 hours to obtain a solid end-modified radial polybutadiene (A). The obtained end-modified radial polybutadiene (A), when measured by GPC, was comprised of an elution component (peak area ratio 18.6%) which had an Mn of 190,000, an Mw of 210,000, and a molecular weight distribution (Mw/Mn) of 1.10, an elution component (peak area ratio 25.4%) which had an Mn of 349,000, an Mw of 353,000, and a molecular weight distribution (Mw/Mn) of 1.01, and an elution component (peak area ratio 56.0%) which had an Mn of 636,000, an Mw of 664,000, and a molecular weight distribution (Mw/Mn) of 1.04. Overall, an Mn was 288,000, an Mw was 479,000, and a molecular weight distribution (Mw/Mn) was 1.67. Further, this end-modified radial polybutadiene (A) had a vinyl bond content of 72.4 mol %. Furthermore, this end-modified radial polybutadiene (A) was measured for $^1$H-NMR, whereupon it was confirmed that trimethoxysilyl groups were introduced.

Next, a 250 ml volume Bravender type mixer was used to knead 100 parts of the end-modified radial polybutadiene (A) for 30 seconds, then 40 parts of silica (made by Rhodia, product name "Zeosil 1165 MP") and 4.3 parts of a silane coupling agent: bis(3-(triethoxysilyl)propyl) tetrasulfide (made by Degussa, product name "Si69") were added and kneaded for 1.5 minutes at an 80° C. start temperature, then 10 parts of process oil (made by Nippon Oil Corporation, product name "Fukkol Elamic 30"), 14 parts of silica (made by Rhodia, product name "Zeosil 1165 MP"), 6 parts of carbon black (made by Tokai Carbon, product name "Seast 6"), 3 parts of zinc oxide, 2 parts of stearic acid, and 2 parts of an antioxidant N-phenyl-W-(1,3-dimethylbutyl)-p-phenylenediamine (made by Ouchi Shinko Chemical Industrial, product name "Nocrac 6C") were added, the result was further kneaded for 2.5 minutes, then the kneaded matter was discharged from the mixer. The temperature of the kneaded matter after the end of the kneading was 150° C. The kneaded matter was cooled down to room temperature, then was again kneaded in a Bravender type mixer for 2 minutes at a 110° C. start temperature, then the kneaded matter was discharged from the mixer. Next, using an open roll, the obtained kneaded matter was kneaded with 1.6 parts of sulfur and a cross-linking accelerator (mixture of 1.4 parts of N-tertiary butyl-2-benzothiazolyl sulfenamide and 1.4 parts of diphenyl guanidine) at 50° C., then a sheet-shaped polymer composition was taken out. This polymer composition was pressed at 160° C. for 30 minutes for cross-linking to prepare a test piece. This test piece was evaluated for abrasion resistance and low heat buildup. Table 2 shows the results. Note that, these evaluations are shown indexed to the polymer composition of the comparative example which is explained later as the reference sample (indexed to 100).

Example 11

Synthesis of End-Modified Radial Polybutadiene and Production of Polymer Composition—2

Under a nitrogen atmosphere, a glass reaction vessel equipped with a magnetic stirrer was charged with 48 parts of cyclohexane, 0.722 part of 1,3,5-trimethylbenzene, and 0.105 part of tetramethylethylenediamine. Next, while stirring, 1.152 parts of sec-butyl lithium (0.05 mol of tetramethylethylenediamine per 1 mol of sec-butyl lithium) was added, the mixture was stirred at a reaction temperature of 20° C. for 3 hours, then the mixture was allowed to stand for 1 day to cause a reaction and thereby obtain 49.979 parts of a lithiated 1,3,5-trimethylbenzene solution. Next, under a nitrogen atmosphere, an autoclave was charged with 800 parts of cyclohexane and 5.56 parts of the above lithiated 1,3,5-trimethylbenzene solution, the temperature of the system was made 60° C., then 5 parts of 1,3-butadiene was added over 1 hour. Next, 195 parts of 1,3-butadiene was further added and the polymerization begun at 60° C. The polymerization reaction was continued for 120 minutes. After the polymerization conversion was confirmed to become from 95% to 100% in range, 0.610 part of tetramethoxysilane was added. The reaction was caused for 30 minutes, then a polymerization stopper comprised of 0.128 part of methanol was added to obtain a solution which contained an end-modified radial polybutadiene. An antioxidant comprised of 0.15 part of 2,4-bis[(octylthio)methyl]-o-cresol (made by Ciba Specialty Chemicals, product name "Irganox 1520") with respect to 100 parts of the polymer component was added to the solution, then steam stripping was used to remove the solvent. The result was vacuum dried at 60° C. for 24 hours to obtain a solid end-modified radial polybutadiene (B). The obtained end-modified radial polybutadiene (B), when measured by GPC, was comprised of an elution component (peak area ratio 20.6%) which had an Mn of 178,000, an Mw of 233,000, and a molecular weight distribution (Mw/Mn) of 1.31, an elution component (peak area ratio 28.5%) which had an Mn of 338,000, an Mw of 359,000, and a molecular weight distribution (Mw/Mn) of 1.06, and an elution component (peak area ratio 50.9%) which had an Mn of 624,000, an Mw of 676,000, and a molecular weight distribution (Mw/Mn) of 1.08. Overall, an Mn was 345,000, an Mw was 494,000, and a molecular weight distribution (Mw/Mn) was 1.43. Further, this end-modified radial polybutadiene (B) had a vinyl bond content of 9.8 mol %. Furthermore, this end-modified radial polybutadiene (B) was measured by $^1$H-NMR whereupon it was confirmed that the trimethoxysilyl groups were introduced.

Next, except for replacing the end-modified radial polybutadiene (A) with the end-modified radial polybutadiene (B) for use, the same procedure was followed as in Example 10 to produce a polymer composition and prepare and evaluate a test piece. Table 2 shows the results. Note that, these evaluations are shown indexed to the polymer composition of the comparative example which is explained later as a reference sample (indexed to 100).

Comparative Example

An autoclave equipped with a stirrer was charged with 4,000 parts of cyclohexane, 500 parts of 1,3-butadiene, and 0.968 part of tetramethylethylenediamine, then n-butyl lithium was added in the amount necessary for neutralizing impurities which would obstruct polymerization which are contained in the cyclohexane and 1,3-butadiene. Next, 0.355 part of n-butyl lithium was added and the polymerization was started at 40° C. After the elapse of 15 minutes from the start of polymerization, 500 parts of 1,3-butadiene was continuously added over 60 minutes. The highest temperature in the polymerization reaction was 60° C. After the end of the continuous addition, the polymerization reaction was continued for a further 10 minutes. After the polymerization conversion was confirmed to become from 95% to 100% in range, a small amount of the polymerization solution was sampled. The sampled small amount of polymerization solution was given an excess of methanol to stop the reaction, then was air dried and measured by GPC and measured by $^1$H-NMR. As a result, the obtained polymer (polybutadiene) had an Mn of 286,000, an Mw of 306,000, a molecular weight distribution (Mw/Mn) of 1.07, and a vinyl bond content of 77.3 mol %. To the remaining polymerization solution, 1.217 parts of polyorganosiloxane expressed by the formula (6) (except that the number of repetitions in formula (6) is the average value in all molecules and the type of the copolymer is random) was added in the state of a xylene solution of a concentration 20%, the solution was made to react for 30 minutes, then a polymerization stopper comprised of 0.356 part of methanol was added to obtain a solution which contains the end-modified polybutadiene (C). 0.15 part of an antioxidant comprised of 2,4-bis[(octylthio)methyl]-o-cresol (made by Ciba Specialty Chemicals, product name "Irganox 1520") with respect to 100 parts of the polymer component was added to the solution, then steam stripping was used to remove the solvent. The result was vacuum dried at 60° C. for 24 hours to obtain a solid end-modified polybutadiene (C).

[Chemical Formula 6]

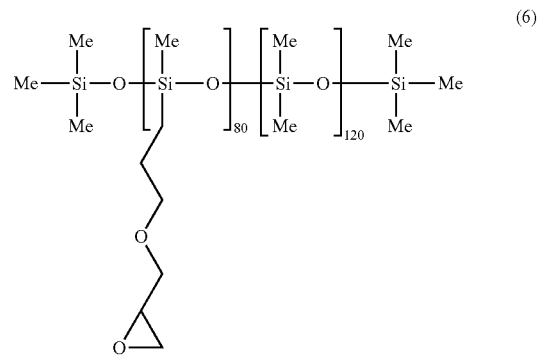

(6)

Next, except for replacing the end-modified radial polybutadiene (A) with the use of end-modified polybutadiene (C), the same procedure was used as in Example 10 to produce a polymer composition and prepare and evaluate a test piece. The results of evaluation of the abrasion resistance and low heat buildup of this polymer composition are shown based on an index evaluation (indexed to 100) as shown in Table 2.

TABLE 2

|  | Ex. 10 | Ex. 11 | Comp. ex. |
| --- | --- | --- | --- |
| Abrasion resistance | 108 | 102 | 100 |
| Low heat buildup | 95 | 83 | 100 |

As will be understood from Table 2, the radial conjugated diene polymer which is obtained by the method of production of a radial conjugated diene polymer of the present invention gives an excellent abrasion resistance and low heat buildup compared with the conjugated diene polymer end-modified by the conventional method.

The invention claimed is:

1. A method of production of a radial conjugated diene polymer comprising polymerizing a monomer mixture which contains at least a conjugated diene compound by using an alkali metal-reacted aromatic compound which has three or more carbon atoms which are directly bonded to alkali metal atoms and aromatic rings in one molecule as a polymerization initiator.

2. The method of production of a radial conjugated diene polymer as set forth in claim 1 wherein said alkali metal-reacted aromatic compound is obtained by causing an aromatic compound which has three or more carbon atoms which are directly bonded to aromatic rings in one molecule to react with an organic alkali metal compound.

3. The method of production of a radial conjugated diene polymer as set forth in claim 2 wherein said alkali metal-reacted aromatic compound is obtained by causing an aromatic compound which has three or more carbon atoms which are directly bonded to aromatic rings in one molecule to react with an organic alkali metal compound in the presence of a compound which has a coordinating ability on alkali metal atoms.

4. The method of production of a radial conjugated diene polymer as set forth in claim 3 wherein said compound which has a coordinating ability on alkali metal atoms is at least one compound which is selected from a cyclic ether compound which has two or more oxygen atoms in the molecule, a tertiary amine compound which has two or more nitrogen atoms in the molecule, and a tertiary amide compound which has a nitrogen-hetero atom bond in the molecule.

5. The method of production of a radial conjugated diene polymer as set forth in claim 4 wherein an amount of presence of said compound which has a coordinating ability on alkali metal atoms is 0.01 to 5 mol with respect to 1 mol of alkali metal atoms in said organic alkali metal compound which is made to react with said aromatic compound which has three or more carbon atoms which are directly bonded to aromatic rings in one molecule.

6. The method of production of a radial conjugated diene polymer as set forth in claim 4 wherein an amount of presence of said compound which has a coordinating ability on alkali metal atoms is 0.02 to 0.4 mol with respect to 1 mol of alkali metal atoms in said organic alkali metal compound which is made to react with said aromatic compound which has three or more carbon atoms which are directly bonded to aromatic rings in one molecule.

7. A radial conjugated diene polymer obtained by the method of production of a radial conjugated diene polymer as set forth in claim 1.

8. A polymer composition including the radial conjugated diene polymer as set forth in claim 7 and a filler.

9. A method of production of an end-modified radial conjugated diene polymer comprising polymerizing a monomer mixture which contains at least a conjugated diene compound by using an alkali metal-reacted aromatic compound which has three or more carbon atoms which are directly bonded to alkali metal atoms and aromatic rings in one molecule as a polymerization initiator, and causing active ends of the obtained polymer having active ends to react with a modifier which is able to react with the active ends.

10. An end-modified radial conjugated diene polymer obtained by the method of production of an end-modified radial conjugated diene polymer as set forth in claim 9.

11. A polymer composition including the end-modified radial conjugated diene polymer as set forth in claim 10 and a filler.

* * * * *